N. O. KENNIKER.
BINDING CORNER CONNECTION FOR KNOCKDOWN BOXES.
APPLICATION FILED APR. 5, 1916.
1,335,060.
Patented Mar. 30, 1920.
4 SHEETS—SHEET 1.
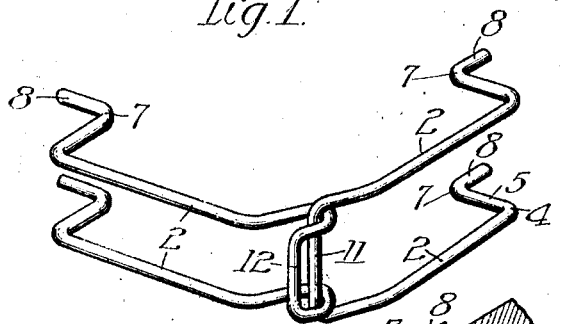
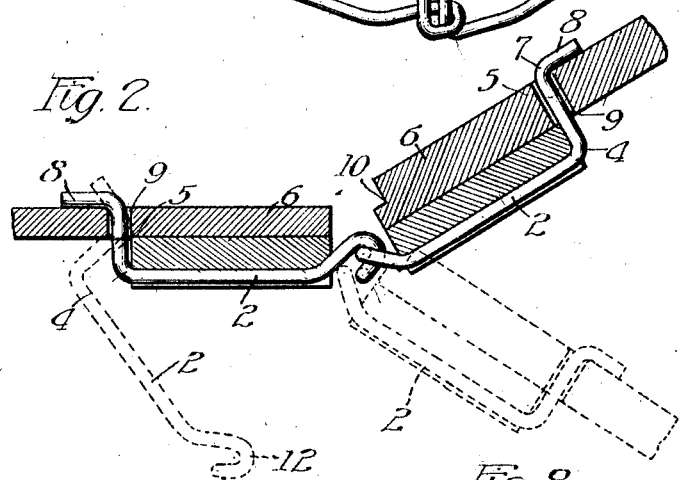
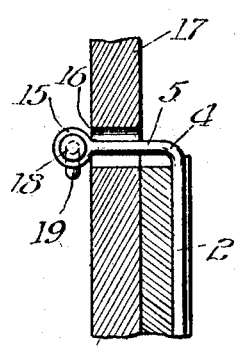
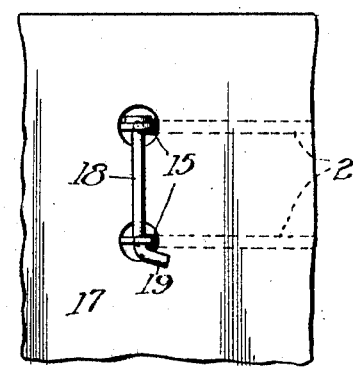

N. O. KENNIKER.
BINDING CORNER CONNECTION FOR KNOCKDOWN BOXES.
APPLICATION FILED APR. 5, 1916.
1,335,060.
Patented Mar. 30, 1920.
4 SHEETS—SHEET 2.
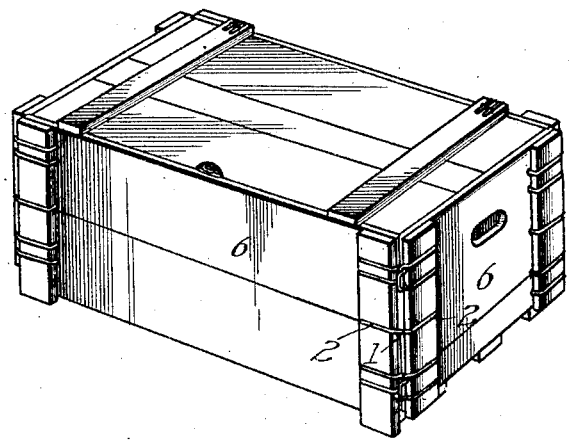
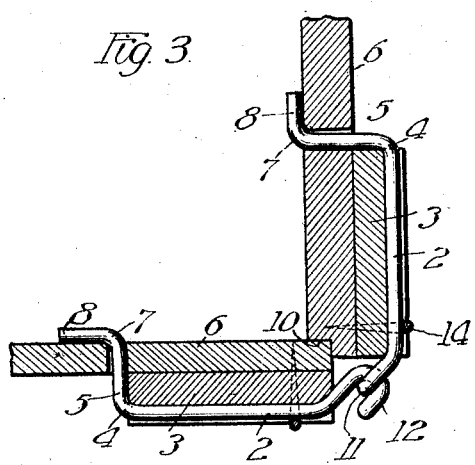
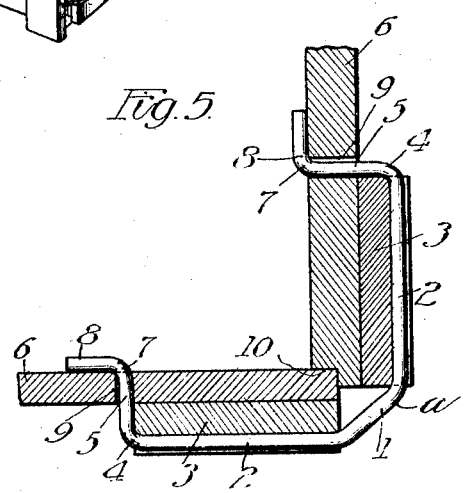
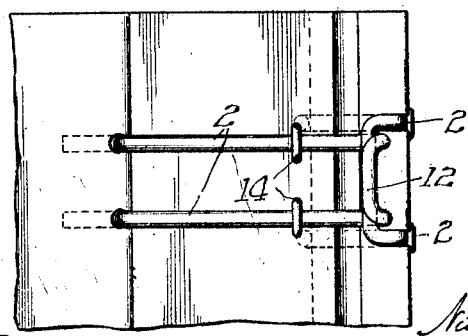
Witnesses:
Inventor
Nicholas O. Kenniker
By his Attys.

N. O. KENNIKER.
BINDING CORNER CONNECTION FOR KNOCKDOWN BOXES.
APPLICATION FILED APR. 5, 1916.
1,335,060.
Patented Mar. 30, 1920.
4 SHEETS—SHEET 3.
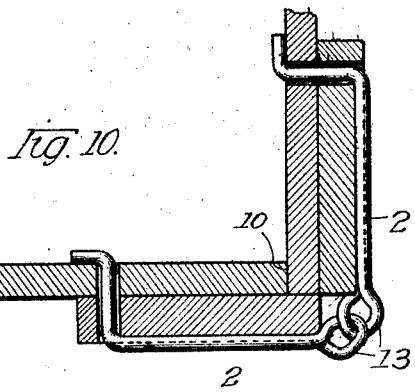
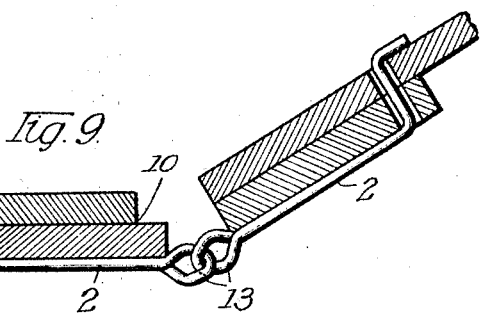
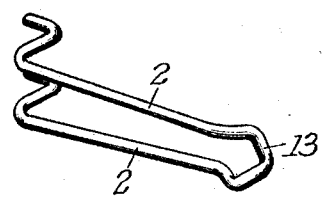
Witnesses:
Inventor
Nicholas O Kenniker N. O. KENNIKER.
BINDING CORNER CONNECTION FOR KNOCKDOWN BOXES.
APPLICATION FILED APR. 5, 1916.

1,335,060.

Patented Mar. 30, 1920.
4 SHEETS—SHEET 4.

Witnesses:
Arthur W. Cashny
Robert H. Weir

Inventor
Nicholas O. Kenniker
By Heis & Heil
Attys.

UNITED STATES PATENT OFFICE.

NICHOLAS O. KENNIKER, OF CHICAGO, ILLINOIS, ASSIGNOR TO DURABLE BOX CO., OF CHICAGO, ILLINOIS, A CORPORATION OF ILLINOIS.

BINDING CORNER CONNECTION FOR KNOCKDOWN BOXES.

1,335,060. Specification of Letters Patent. Patented Mar. 30, 1920.

Application filed April 5, 1916. Serial No. 89,228.

*To all whom it may concern:*

Be it known that I, NICHOLAS O. KENNIKER, a citizen of the United States, residing at Chicago, in the county of Cook and State of Illinois, have invented certain new and useful Improvements in Binding Corner Connections for Knockdown Boxes, of which the following is a description.

My invention belongs to that general class of devices such as boxes, crates, and the like, which may be readily and easily assembled, for use in the intended manner, and also may be readily disassembled, so that the various parts may be put together in knock-down position, either for shipping or storage purposes. It particularly belongs to devices of the class mentioned in which suitable means are provided for firmly binding the corners of the box or similar device together, to complete a rigid structure of great strength, and which will withstand the rough usage to which such devices are frequently subjected. The object of my invention is to produce adequate and reliable binding connections for the corners of such boxes, as well as the box which is so constructed, the whole of which may be constructed at a minimum cost, both as to the connections themselves and to their application and use upon the devices to which they are adapted to be applied.

To this end my invention consists in the novel construction, arrangement and combination of parts herein shown and described, and more particularly pointed out in the claims.

In the drawings, wherein like reference characters indicate like or corresponding parts, Figure 1 is a perspective view of the preferred form of my invention;

Fig. 2 is a sectional view, illustrating the manner of assembling the connections upon the proximate walls of a box. As here shown, the walls are positioned at an obtuse angle for the purpose which will be hereafter described;

Fig. 3 is a similar section, showing the proximate walls of the box brought together at a right angle to form the corner, said walls being firmly bound together by my improved corner connections;

Fig. 4 is a plan view of one of my connections taken substantially from below Fig. 3 and looking upward;

Fig. 5 is a section similar to Fig. 3, illustrating a modified construction;

Fig. 6 is a perspective view of a box of the character described, equipped with my improved corner connections;

Figs. 7 and 8 are detail views, illustrating the preferred manner of securing the binding connections to the fourth corner of the box in assembling the same;

Fig. 9 is a sectional view similar to that shown in Fig. 2, illustrating a modified form of connecting devices;

Fig. 10 is a section substantially similar to Fig. 3, illustrating the position of the connecting members of Fig. 9, when the corner of the box is completed, and Fig. 11 is a perspective view of one of the connecting members illustrated in Figs. 9 and 10.

Figure 15:
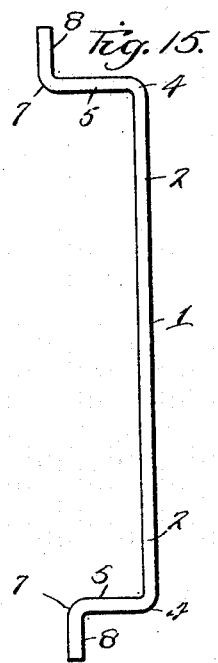
Fig. 15 is a plan view of the preferred form of the integral connecting member illustrated in Fig. 5 before being engaged with the box.

The broad idea of my improved binding corner connection is illustrated in Fig. 5, in which the metal member 1 is provided with sections 2—2, which lie embedded within the surface of the cleats 3—3, said members being bent substantially at a right angle, as at 4—4, and after being extended to form sections 5—5, which in the particular case illustrated is the distance from the bottom of the section 2 to the inner surface of the walls 6, and is then again bent at substantially a right angle, as at 7—7, with the free ends 8—8 extending in the same general direction as the sections 2, and adapted to lie upon the inner surface of the walls 6—6, as clearly shown in the drawings. This metal member, which may be straight or nearly straight between the sections 2—2, or so they will lie in the same general direction, may be readily assembled upon a box when the walls 6—6 are brought together at an obtuse angle, substantially as shown in Figs. 2 and 9, by passing the free ends 8—8 through suitable apertures 9—9, formed in the walls of the box for this purpose. The said apertures are just large enough to permit said ends to be readily passed through the walls, as indicated. Now upon bringing the free ends of the walls 6—6 toward each other to form a right angle corner indicated in Fig. 5; the said member is of such length that it will bring a strain thereon, causing the connecting section between the parts 2—2 to assume an angle substantially as indicated in Fig. 5, at the point marked $a$. The strain on the connecting member serves to firmly lock the parts together. The side walls are preferably notched as at 10, so that when the corner is formed the walls are interlocked to prevent end movement of one on the other.

The member just described is preferably employed in practice as an auxiliary connecting member positioned between other members, which will be further described, that are positioned near the ends of the cleats, as indicated in Fig. 6. The member just described is a unitary integral member possessing great strength, and by being made of a single piece there is no possibility of lost motion between the connecting parts.

In the preferred form of construction which is indicated near the ends of the cleats in Fig. 6, which preferred form is more particularly illustrated in Fig. 1, said connecting member is composed of two parts adapted to be detachably connected to one another in assembling the box, or disconnecting in taking the box down. As shown, the sections 2—2 operate in substantially the same manner as said sections heretofore described. In the preferred form, however, the two parts of the member are each formed by bending the free ends of a rod backward to extend in the same general direction, said legs being connected by a section, which in one member simply forms a loop, as indicated at 11, while in the other it forms a coöperating hook 12, adapted to be engaged with said loop. The said parts are bent at an angle at 4—4, as previously described, with the intermediate sections 5, the angles 7, and the underlying free ends 8, as previously described, all operating as heretofore described.

The method of assembling these connections upon a box is clearly illustrated in Figs. 2 and 3, the free ends of the connecting members made to be slipped through the apertures 9 mentioned, and in the manner illustrated in Fig. 2. Each member may be so connected with a side wall near the end thereof, the proximate walls being brought into substantially an obtuse angle with one another, as shown in Fig. 2, the hook 12 may be engaged with the hook 11 and the free ends of the walls brought toward each other to form the corner shown in Fig. 3. This brings a strain on the connecting members, as described, and firmly binds the corners of the box, as before stated.

In the modified form shown in Figs. 9, 10 and 11, the connecting member is formed of two similar looped members having the free ends constructed as heretofore described, which free ends are to be engaged with the walls of the box, as heretofore described and as illustrated in Figs. 9 and 10. The looped ends 13 may be engaged with each other, as indicated in Fig. 9, and the free ends of the members engaged with the proximate walls of the box, said walls being brought to an obtuse angle, or even extended beyond that, to properly connect the members to the walls, after which the free ends of the walls may be brought toward each other to form the corner, as indicated in Fig. 10, again bringing a strain on the connecting member and firmly binding the corners of the box together.

It is obvious that three corners of the box may be connected in the manner heretofore described. The fourth one, however, cannot be so connected for the reason that the proximate walls being engaged with one another, will prevent the walls of the fourth corner being brought into the positions of an obtuse angle with one another. The fourth corner, therefore, may be connected in any preferred manner, which will give the ready attachability or detachability of the parts desired.

In the preferred construction, the structure is the same as previously described with this exception: one end of the connecting member, while bent at an angle as at 4, and provided with a section as at 5, lacks the second bend as heretofore described. It, however, terminates in a loop or eye 15 shown in Figs. 7 and 8. This eye, upon bringing the fourth corner together, is passed through an enlarged aperture 16 in the wall 17, and a pin 18 is passed therethrough, as indicated, which, if desired, may have the free end 19 bent to prevent accidental disengagement. This pin may be of a length, as shown in Fig. 8, sufficient to pass through the two legs of a looped connecting member, or may be long enough to pass through all the connecting members at that corner of the box. The locking means being thus positioned upon the inside wall of the box, is not in such position as to be tampered with, and when the box is locked, is safe from all interferences.

If preferred, staples 14, as indicated in Fig. 3, may be employed at any point to bind the section 2 within its groove in the upper surface of the cleats. In practice, however, this is not found necessary. I do, however, in all cases prefer to embed the section 2 in the cleat, as indicated, as it serves to protect the said section from catching upon various obstructions in moving the box, and at the same time confines the section at that point, and prevents the endwise or edgewise slipping of the proximate walls of the box in the direction opposite to that protected by the notch 10. In other words it confines the connecting member at that exact point upon the cleats.

In constructing my box, I form up the several side walls, together with the top and bottom, at the factory, with the cleats 3 secured in position, as indicated, preferably with the grain of the wood across the grain of the wall of the box, to give greater strength and prevent splitting. These cleats, however, need not be so strongly nailed upon the walls as is generally found necessary, for the reason that when my connecting members are in position on the box, as indicated, the strain brought upon said members, while firmly binding the corners of the box together, serves a still further purpose by firmly binding the cleats upon the walls of the box, as shown.

Figure 12:
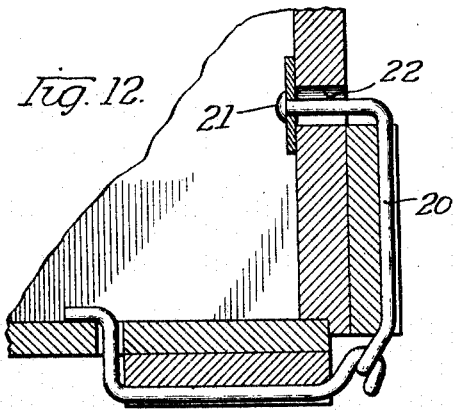
Fig. 12 is a sectional view similar to Fig. 3, illustrating another method of securing the member at the front corner of the box.
Figure 13:
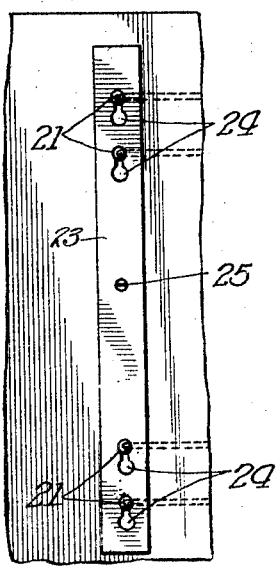
Fig. 13 is a front view of the locking member shown in Fig. 12.

As shown in Figs. 12 and 13, the free ends of the member 20 are provided with a head 21, which readily passes through the opening 22 in the wall of the box. A locking member 23 has coöperating slots 24 formed therein, which passing freely over the heads 21 by a longitudinal movement of the member, locates the neck in the head in the reduced portion of the slot, thus preventing the withdrawal of the member 20. A screw 25 or equivalent part may serve to secure the locking member to the wall of the box, preventing accidental disengagement of the parts.

Figure 14:
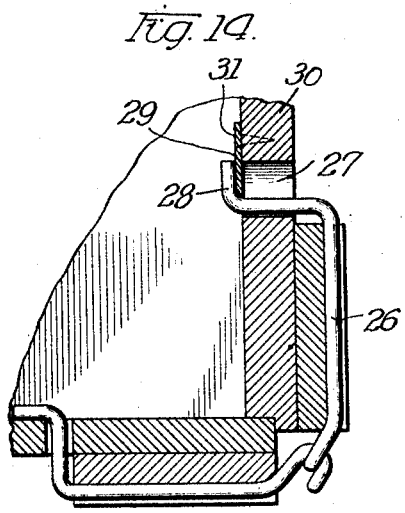
Fig. 14 is a section similar to Fig. 12, showing another form of locking member.

In Fig. 14 the free end of the member 26 is formed as in the coöperating member, the opening 27 being of sufficient size to permit the end 28 to pass therethrough. A locking plate 29 is then positioned between the ends 28 and the wall 30, preventing the withdrawal of the said ends. Screws 31 or equivalent means serve to secure the plate 29 in place.

The bottom and cover of the box may be secured to the walls in any preferred manner, and may be assembled and put in position as the side walls are assembled. The connection of the bottom and top of the walls is such as to preserve the ready attachability or detachability of the parts going to make up the box. Such methods, however, being well known, a further description in relation to such parts will not be necessary.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. A box comprising side walls and end walls, each provided with transverse cleats near the ends thereof, and with a top and bottom connected to the walls, said side and end walls being connected at the corners of said box by binding corner connections, those near the ends of the cleats comprising detachably connected metal parts, each having the free ends passed through apertures in the walls and lying upon the inner surface thereof, with the intermediate section partially embedded in the outer surface of the cleats, and an auxiliary connecting member positioned between the other two connections, comprising an integral binding member similarly engaging the box, and similarly embedded in the outer surface of the cleat.

2. Binding corner connections for boxes and the like, comprising a metallic member formed of two hinged parts permitting relative swinging movement of said parts, each of the parts being formed with the free ends bent at substantially a right angle and extending a limited distance then again bent at substantially a right angle and extending in substantially the same direction as the proximate part of the main part of said member.

3. Binding corner connections for boxes and the like comprising a metallic member formed of two parts, said parts being formed with coöperating end portions constituting a hinged connection between said parts to permit a free relative movement of the same, each of said parts being then bent to engage different walls of the box and to be held in such engagement.

4. Binding corner connections for boxes comprising a metal member composed of two detachable parts having a hinged connection therebetween, said hinged connection comprising a hooked end on one part adapted to extend around a loop on the other part, each part formed with its free ends disposed at substantially a right angle and extended a limited distance, and then bent at substantially a right angle and extending in substantially the same direction as the approximate part of the main body of said member.

5. Binding corner connections for boxes and the like comprising metallic members, said members being composed of relatively resilient material and formed with one end bent at substantially a right angle and extending a limited distance, then bent at substantially a right angle and extending in substantially the same general direction as the approximate part of the main body of the device with the other free end thereof bent at an angle and provided with a securing eye portion, substantially as described.

6. A box comprising suitable walls and binding corner connections therefor, each comprising a metallic member formed of two detachable hinged parts permitting a swinging movement of one part relative to the other, each of said parts being formed of substantially resilient metal and adapted to have an end portion passing through an aperture in a wall and provided with an offset part engaging the inner surface of the wall, the resilient formation of said parts serving to assist in maintaining them in position.

In testimony whereof, I have hereunto signed my name in the presence of two subscribing witnesses.

NICHOLAS O. KENNIKER.

Witnesses:
JOHN W. HILL,
CHARLES I. COBB.